(12) United States Patent
Sato et al.

(10) Patent No.: US 8,159,605 B2
(45) Date of Patent: Apr. 17, 2012

(54) FRAME INTERPOLATING APPARATUS AND METHOD

(75) Inventors: Teruyuki Sato, Kawasaki (JP); Takashi Hamano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 951 days.

(21) Appl. No.: 12/058,078

(22) Filed: Mar. 28, 2008

(65) Prior Publication Data

US 2009/0015712 A1    Jan. 15, 2009

(30) Foreign Application Priority Data

Jul. 13, 2007  (WO) .................. PCT/JP2007/000762
Nov. 14, 2007  (JP) ................................. 2007-296138

(51) Int. Cl.
   *H04N 7/01*    (2006.01)
(52) U.S. Cl. .................... 348/441; 348/669; 375/240.12
(58) Field of Classification Search .................. 348/441, 348/699–701; 375/240.12, 240.16, 240.26
   See application file for complete search history.

(56) References Cited

U.S. PATENT DOCUMENTS

| | | | | |
|---|---|---|---|---|
| 5,045,939 A | * | 9/1991 | Okayama et al. ............. | 348/445 |
| 5,371,539 A | * | 12/1994 | Okino et al. ............... | 348/208.6 |
| 5,719,947 A | * | 2/1998 | Enomoto et al. ............... | 382/107 |
| 6,452,871 B1 | * | 9/2002 | Sotelo et al. ..................... | 368/10 |
| 6,452,971 B1 | * | 9/2002 | Iwasaki et al. ........... | 375/240.12 |
| 6,816,617 B2 | * | 11/2004 | Yamori et al. ................. | 382/236 |
| 7,333,132 B2 | * | 2/2008 | Shimizu et al. ............ | 348/208.1 |
| 7,965,303 B2 | * | 6/2011 | Hanaoka et al. .............. | 345/606 |
| 2006/0285596 A1 | | 12/2006 | Kondo et al. | |

FOREIGN PATENT DOCUMENTS

| | | |
|---|---|---|
| JP | 11-112940 | 4/1999 |
| JP | 2000-134585 | 5/2000 |
| JP | 2001-24988 | 1/2001 |
| JP | 3362463 | 10/2002 |
| JP | 2005/252360 | 9/2005 |
| JP | 2006-279982 | 10/2006 |
| JP | 2006-331136 | 12/2006 |
| JP | 2007-60192 | 3/2007 |

* cited by examiner

*Primary Examiner* — Annan Shang
(74) *Attorney, Agent, or Firm* — Staas & Halsey LLP

(57) ABSTRACT

A motion vector is searched for each block of the current video frame by using a previous average motion vector within a screen as a reference motion vector, and whether or not interpolation is effective is determined by using the obtained motion vector. If the interpolation is determined to be effective, an interpolation frame is generated between the current video frame and a preceding video frame by using the obtained motion vector.

11 Claims, 22 Drawing Sheets

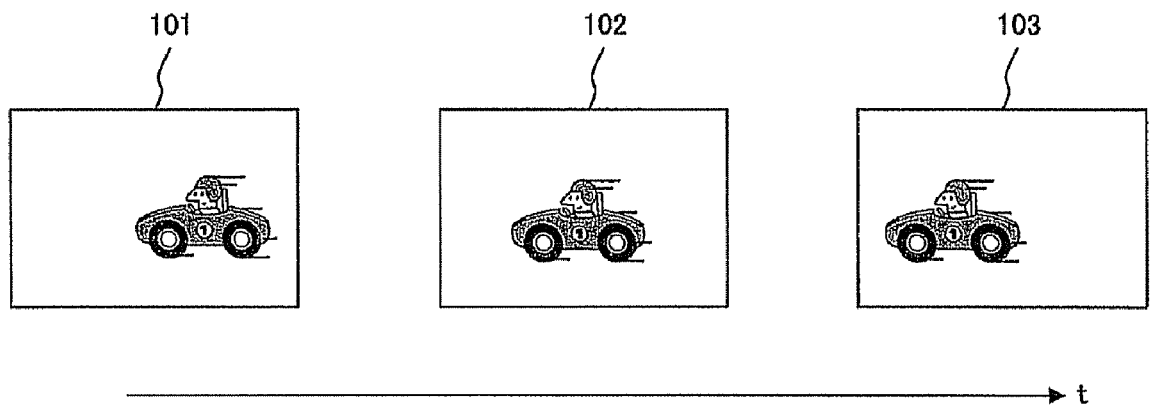
F I G. 1A

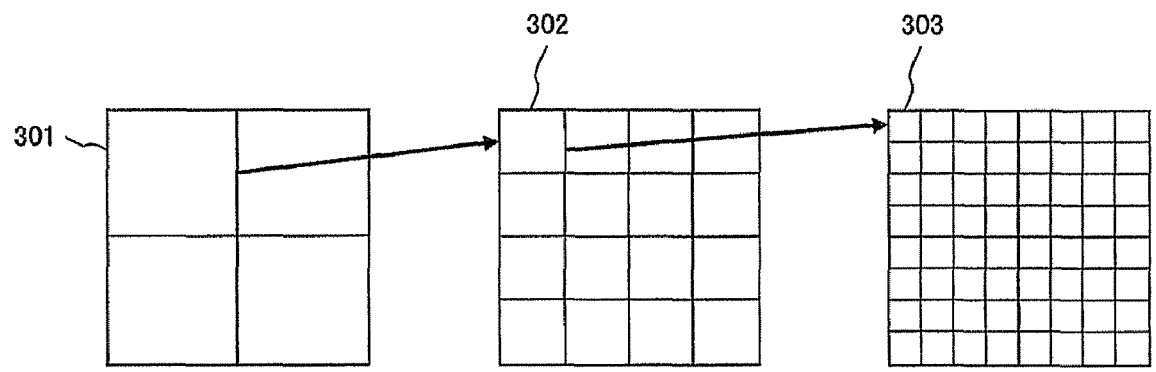
F I G. 1 C

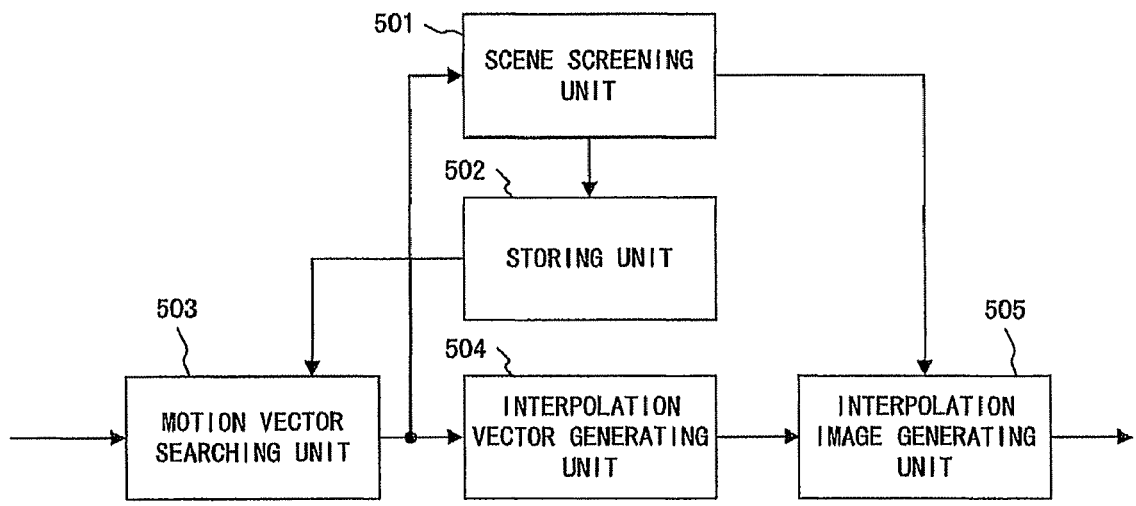
F I G. 2 A

| 35 | 35 | 34 | 33 | 35 | 35 | 34 | 33 |
|---|---|---|---|---|---|---|---|
| 128 | 85 | 37 | 33 | 33 | 35 | 37 | 33 |
| 134 | 130 | 123 | 88 | 34 | 35 | 36 | 38 |
| 133 | 134 | 134 | 134 | 133 | 74 | 34 | 34 |
| 135 | 135 | 134 | 133 | 135 | 135 | 94 | 33 |
| 128 | 135 | 137 | 133 | 128 | 135 | 137 | 133 |
| 134 | 130 | 123 | 138 | 134 | 130 | 123 | 138 |
| 133 | 134 | 134 | 134 | 133 | 134 | 134 | 134 |

1001

F I G. 6

|    | −2  | −1  | 0   | +1  | +2  |
|----|-----|-----|-----|-----|-----|
| −2 | 984 | 889 | 731 | 611 | 714 |
| −1 | 746 | 398 | 405 | 321 | 398 |
| 0  | 811 | 176 | 61  | 210 | 564 |
| +1 | 931 | 476 | 223 | 266 | 411 |
| +2 | 768 | 667 | 312 | 569 | 377 |

F I G. 7

|     | -2  | -1  | 0   | +1  | +2  |
| --- | --- | --- | --- | --- | --- |
| -2  | 232 | 238 | 241 | 239 | 237 |
| -1  | 109 | 113 | 121 | 124 | 125 |
| 0   | 60  | 41  | 26  | 9   | 34  |
| +1  | 222 | 193 | 172 | 151 | 144 |
| +2  | 353 | 320 | 294 | 273 | 259 |

1111

|     | -2  | -1  | 0   | +1  | +2  |
| --- | --- | --- | --- | --- | --- |
| -2  | 500 | 400 | 300 | 200 | 300 |
| -1  | 400 | 300 | 200 | 100 | 200 |
| 0   | 300 | 200 | 100 | 0   | 100 |
| +1  | 400 | 300 | 200 | 100 | 200 |
| +2  | 500 | 400 | 300 | 200 | 300 |

1112

|     | -2   | -1   | 0    | +1   | +2   |
| --- | ---- | ---- | ---- | ---- | ---- |
| -2  | 2530 | 6016 | 4739 | 2531 | 6869 |
| -1  | 1623 | 6339 | 4884 | 1956 | 7244 |
| 0   | 881  | 6528 | 5041 | 1772 | 7150 |
| +1  | 896  | 6560 | 5044 | 1813 | 7063 |
| +2  | 911  | 6676 | 5093 | 1907 | 7006 |

1113

|     | -2   | -1   | 0    | +1   | +2   |
| --- | ---- | ---- | ---- | ---- | ---- |
| -2  | 9250 | 7400 | 5550 | 3700 | 5550 |
| -1  | 7400 | 5550 | 3700 | 1850 | 3700 |
| 0   | 5550 | 3700 | 1850 | 0    | 1850 |
| +1  | 7400 | 5550 | 3700 | 1850 | 3700 |
| +2  | 9250 | 7400 | 5550 | 3700 | 5550 |

1114

F I G. 9

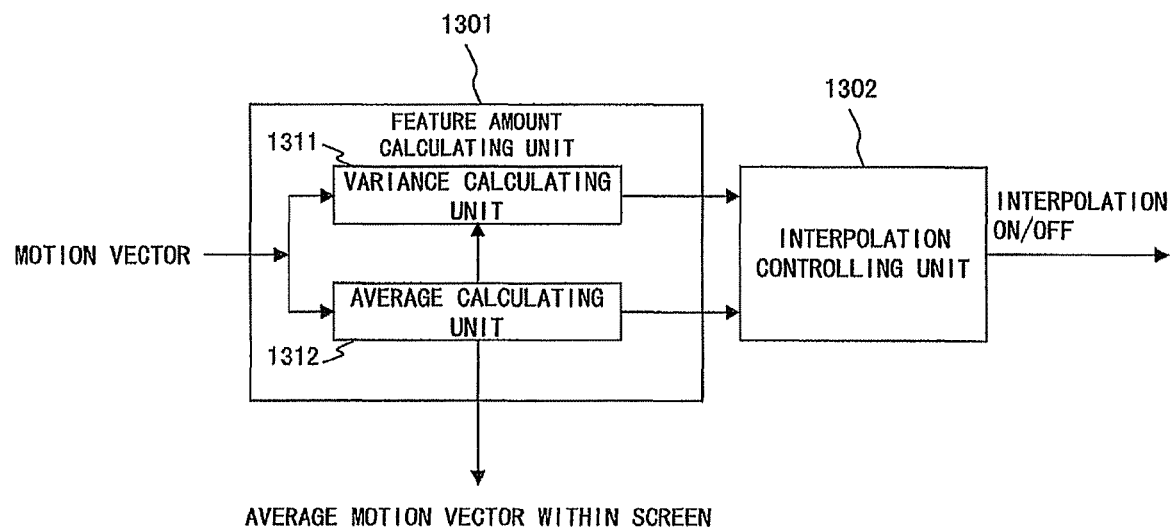
F I G. 11

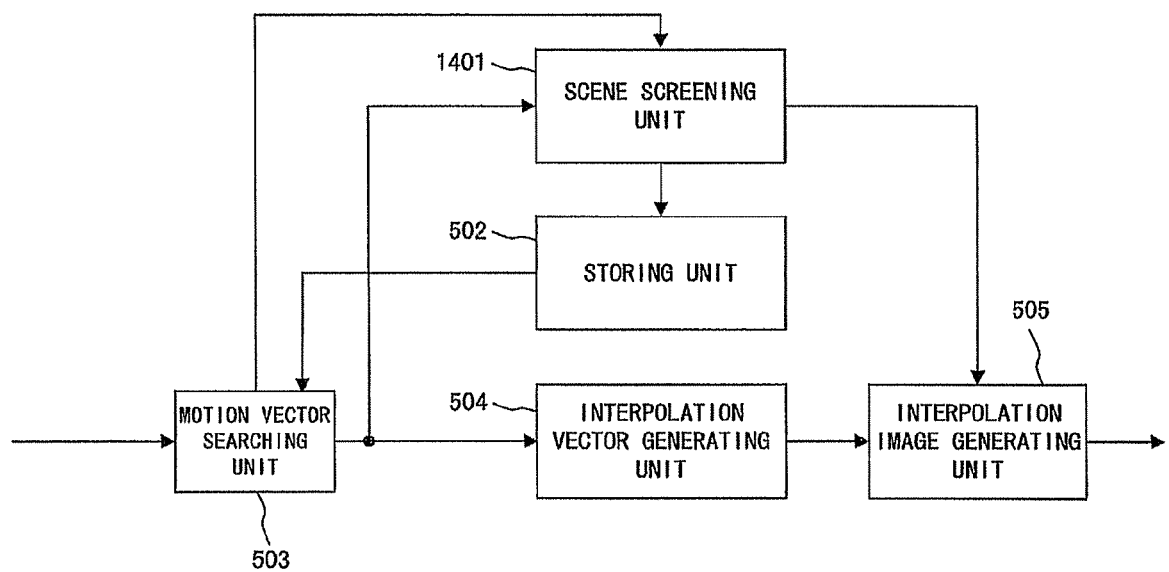
F I G. 12

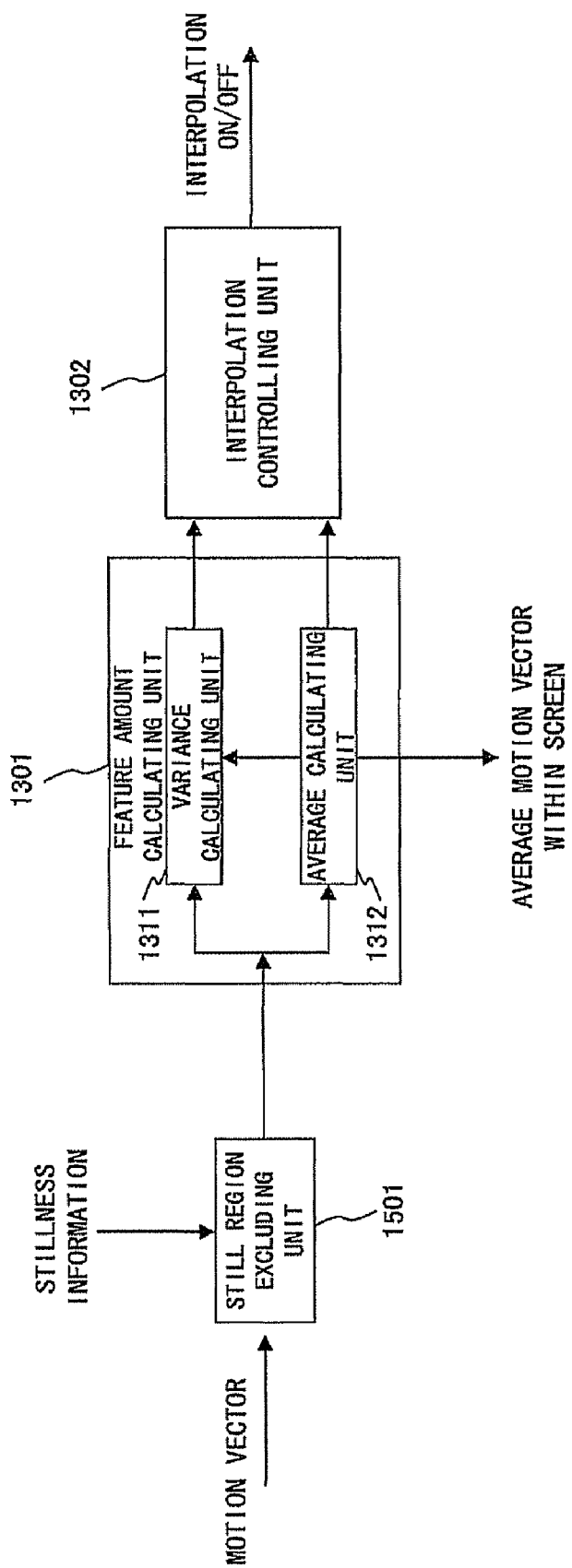
F I G. 13

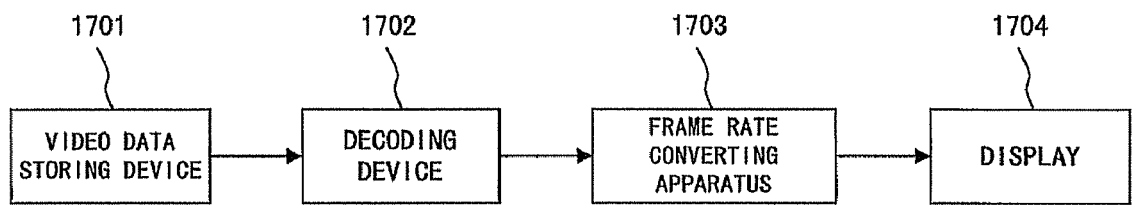
F I G. 1 5

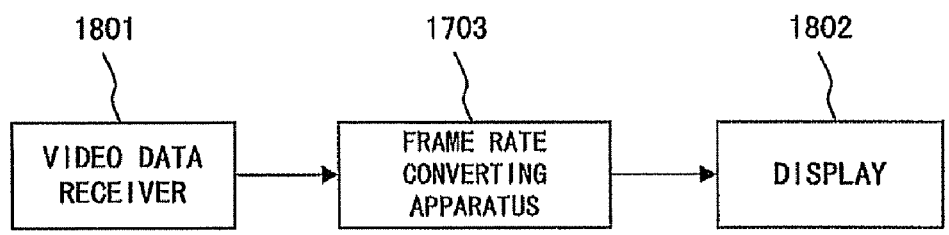
F I G. 1 6

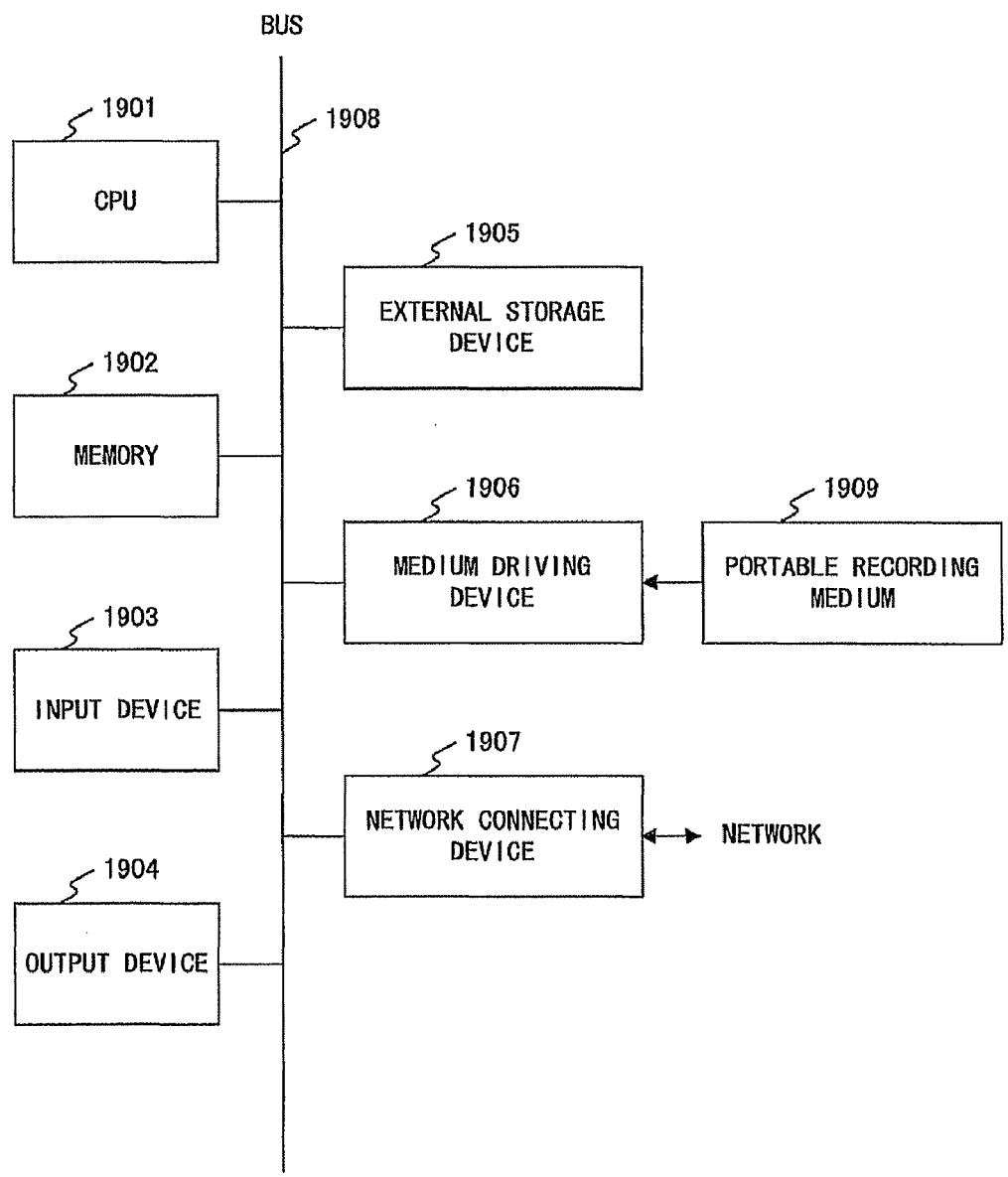
F I G. 1 7

FRAME INTERPOLATING APPARATUS AND METHOD

BACKGROUND OF THE INVENTION

1. Field of the Invention

The present invention relates to a frame interpolation technique for generating a nonexistent video frame between two video frames by using interpolation.

2. Description of the Related Art

For a liquid crystal display (LCD), which is one of displays used for flat-screen televisions, a hold display for continuously drawing an image until the next video frame reaches is used in contrast to an impulse display for drawing a momentary image on a display such as a CRT (Cathode Ray Tube) or a plasma display.

With the hold display, the phenomenon of motion judder is caused, in a moving object being displayed, by a mismatch between motion interpolation according to pursuit eye movements and the hold display for remaining the position of the moving object unchanged. Additionally, with ISDB-T one-segment broadcasting, which has started in recent Japan, a motion is noticeably unnatural in some cases because a frame rate is on the order of 15 fps, which is lower than the current analog broadcasting.

As a solution to this problem, it is effective to generate an intermediate frame between video frames, and to present a video image the motion of which is interpolated. How to make the motion interpolation is depicted in FIG. 1A. An interpolation frame 102, for example, exactly at a midpoint time t−½ is generated by obtaining a motion vector within a screen from a frame 101 at a time t−1, and a frame 103 at a time t, and by compensating for a motion after a time of ½. This can improve the quality of the video motion.

However, a motion vector search requires an enormous amount of calculation. Especially, if a large motion, namely, a video image the frame interpolation effect of which becomes remarkable is interpolated, a search cannot be terminated in realistic time. Accordingly, frame interpolation of a scene screening type, with which frame interpolation is implemented by interpolating only a scene the motion of which has a particular feature, has been proposed as a practically effective method (for example, see the following Patent Documents 1 and 2).

Patent Document 1: Japan Patent Application Publication No. 11-112940

Patent Document 2: Japan Patent Application Publication No. 2000-134585

FIG. 1B shows a configuration example of such a frame interpolating apparatus of a scene screening type. A scene screening unit 201 determines whether or not a scene is one having a feature, according to a motion vector obtained by a motion vector searching unit 202, and outputs an interpolation control signal to an interpolation image generating unit 203. The interpolation control signal becomes ON (valid) if a scene having a feature is detected, or becomes OFF (invalid) unless otherwise detected. The interpolation image generating unit 203 generates an interpolation frame from a motion vector only if the interpolation control signal is ON.

Examples of a scene the motion of which has a particular feature include a constant-speed scrolling scene. In this case, it is necessary to satisfy a condition that the directions of vectors within a screen are identical. However, if a portion not in motion, such as a superimposed telop, exists within a screen, the portion is not included by scene screening due to a 0 component of the corresponding vector in some cases. Additionally, motion vectors vary in a portion such as the sky or a water surface where the image complexity is low, leading to difficulty in scene screening. If the scene screening cannot be made, unnaturalness as a moving image becomes noticeable on the contrary due to a switching between the presence and the absence of an interpolation frame.

Furthermore, in a portion, such as a window of a building, where a artificial pattern is repeated, a motion vector tends to be erroneously searched, and such a portion sometimes becomes noticeable as a portion degraded by erroneous interpolation when an interpolation frame is generated.

It is conventionally pointed out that the accurate obtainment of a motion vector is important in frame interpolation, and a technique using a prediction vector is known as one of methods for obtaining a motion vector. The above cited Patent Documents 1 and 2 disclose a method for predicting and searching a motion vector from within a space.

With this prediction technique, a motion vector in a medium region 302 is searched based on a result of a search made in a large region 301, and a motion vector in a small region 303 is searched based on a result of the search made in the medium region 302 as shown in FIG. 1C. With this method, motion vectors are allowed to vary while a search is again made in a smaller region to satisfy a condition of the minimum prediction residual if a prediction error is large.

In contrast, also a technique for predicting a motion vector not in a spatial direction but in a temporal direction has been proposed (for example, see the following Patent Document 3).

Patent Document 3. Japan Patent Application Publication No. 2006-331136

FIG. 1D shows a configuration example of a frame interpolating apparatus using a prediction vector in a temporal direction. A motion vector obtained by a motion vector searching unit 401 is held in a motion vector memory 402 as a reference motion vector, and used to search a motion vector of the next frame. An interpolation image generating unit 403 generates an interpolation frame from the motion vector.

With this method, there are no problems if a prediction vector in a temporal direction is suitable. However, an undesirable motion is sometimes generated especially in a portion, such as the sky or a water surface, where an activity is low. In such a portion, it is difficult to determine whether or not a motion vector is proper regardless of the direction of the motion vector. Therefore, a search result is confined to a prediction vector given in a temporal direction even if the prediction vector differs from a proper motion vector. As a result, an erroneous motion vector continues to be selected, leading to degradation in the video image of an interpolation frame.

Furthermore, since prediction in a spatial direction is not made, this method is totally ineffective for the above described variance of motion vectors.

The following Patent Document 4 relates to an interpolation frame generating apparatus that can display a background image more sharply by assigning an accurate motion vector to an occlusion region.

Patent Document 4: Japan Patent Application Publication No. 2007-060192

SUMMARY OF THE INVENTION

An object of the present invention is to prevent scene screening from being disabled by a variance of motion vectors, and to stably generate an interpolation frame.

In a first aspect of the present invention, a frame interpolating apparatus comprises an average calculating unit, a storing unit, a motion vector searching unit, an interpolation controlling unit, and an interpolating unit. This apparatus obtains a motion vector for each block within an input video frame, and generates an interpolation frame from the obtained motion vector.

The average calculating unit calculates an average motion vector within a screen by averaging motion vectors within the screen for each video frame, and the storing unit stores the calculated average motion vector within the screen. The motion vector searching unit searches a motion vector for each block of the current video frame by using a previous average motion vector within a screen, which is stored in the storing unit, as a reference motion vector. The interpolation controlling unit determines whether or not interpolation is carried out by using an obtained motion vector. The interpolating unit generates an interpolation frame between the current video frame and the preceding video frame by using the obtained motion vector if the interpolation is determined to be carried out.

A motion vector is searched by using an average motion vector within a screen as a reference motion vector, whereby a variance of motion vectors between blocks can be suppressed. Whether or not interpolation is effective is determined by using such a motion vector, whereby the possibility that a scene having a feature, such as a constant-speed scrolling scene, is interpolated can be increased. Accordingly, scene screening can be made with high precision in a wide range. As a result, an interpolation effect can be produced for a lot more video frames.

In a second aspect of the present invention, the motion vector searching unit includes a correlation calculating unit, a stillness determining unit, and a bias adding unit.

The correlation calculating unit calculates a correlation value between the current video frame and the preceding video frame for each of a plurality of motion vector candidates for one block within the current video frame. The stillness determining unit determines whether or not the block is a still region. The bias adding unit selects one motion vector candidate by adding a search bias for increasing the probability of selecting the reference motion vector to a correlation value of each motion vector candidate for a block determined not to be a still region, and outputs the selected motion vector candidate as a motion vector of the block.

The probability that an average motion vector within a screen, which is a reference motion vector, is selected as a motion vector of a region other than a still region is increased, whereby a variance of motion vectors can be suppressed by restricting only to a region in motion. Accordingly, even if a portion not in motion, such as a superimosed telop, exists within a screen, a scene the motion of which has a feature can be detected with high accuracy, and the number of video frames selected by scene screening further increases.

A variance of motion vectors between blocks can be suppressed, and the number of video frames selected by scene screening increases. Accordingly, scene screening can be made with higher accuracy in a wider range in comparison with conventional techniques, and an interpolation effect can be produced for a lot more video frames.

BRIEF DESCRIPTION OF THE DRAWINGS

FIG. 1A shows motion interpolation;
FIG. 1C shows motion vector prediction in a spatial direction;
FIG. 2A shows a configuration of a first frame interpolating apparatus;
FIG. 6 shows luminance values of pixels within a block;
FIG. 7 shows a similarity degree value table;
FIG. 9 shows similarity degree value tables and bias value tables of two types;
FIG. 11 shows a configuration of a first scene screening unit;
FIG. 12 shows a configuration of a second frame interpolating apparatus;
FIG. 13 shows a configuration of a second scene screening unit;
FIG. 15 shows a configuration of a video reproducing apparatus;
FIG. 16 shows a configuration of a video displaying apparatus;
FIG. 17 shows a configuration of an information processing device.

DESCRIPTION OF THE PREFERRED EMBODIMENTS

Figure 1B:
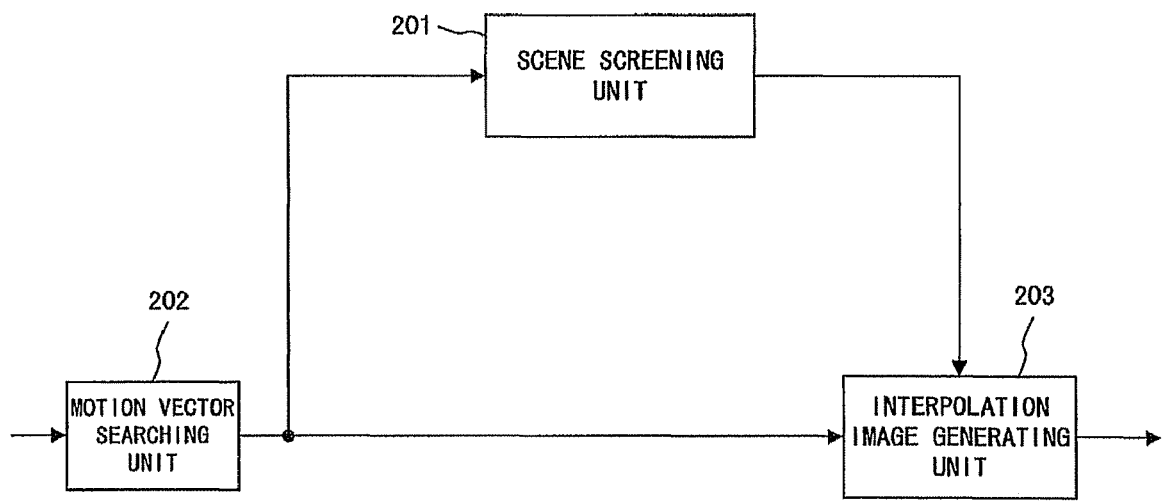
FIG. 1B shows a configuration of a frame interpolating apparatus of a scene screening type.
Figure 1D:
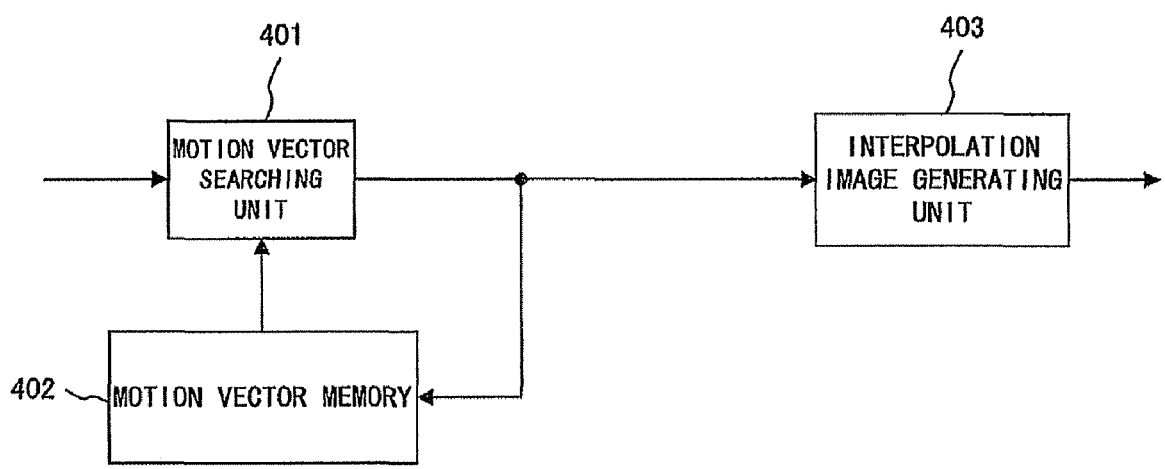
FIG. 1D shows a configuration of a frame interpolating apparatus using a prediction vector in a temporal direction.

A preferred embodiment for carrying out the present invention is described in detail below with reference to the drawings.

FIG. 2A shows a configuration example of a frame interpolating apparatus according to a preferred embodiment. This frame interpolating apparatus comprises a scene screening unit 501, a storing unit 502, a motion vector searching unit 503, an interpolation vector generating unit 504, and an interpolation image generating unit 505.

The motion vector searching unit 503 makes a matching between blocks (rectangular regions) of a predetermined size of two input video frames, and obtains a motion vector of a moving object from a result of the matching. The obtained motion vector is output to the scene screening unit 501 and the interpolation vector generating unit 504.

The scene screening unit 501 determines for each frame whether or not a scene has an interpolation effect by executing a statistical process for motion vectors within a screen, and outputs an interpolation control signal to the interpolation image generating unit 505. The interpolation control signal becomes ON (valid) if a scene having the interpolation effect is detected, and becomes OFF (invalid) unless otherwise detected. The scene having the interpolation effect is, for example, a scene scrolling at a constant speed in a certain direction such as a vertical direction, a horizontal direction, or the like.

The scene screening unit 501 calculates an average motion vector within a screen during the scene screening, and stores the calculated vector in the storing unit 502. For example, if the entire screen is scrolling, the average motion vector within the screen matches the scrolling speed. The motion vector searching unit 503 retrieves a previous average motion vector within a screen held in the storing unit 502, and obtains a motion vector from the result of the matching by using the retrieved average motion vector as a reference motion vector.

The interpolation vector generating unit 504 generates from the motion vector, which is obtained by the motion vector searching unit 503, an interpolation vector indicating at which point each pixel starts to be interpolated, and outputs the generated vector to the interpolation image generating unit 505. The interpolation vector is a vector used when a reference pixel is calculated in order to obtain the image of an interpolation frame.

For example, if an interpolation frame is generated at the midpoint between two input video frames, an interpolation vector is equivalent to a vector having a magnitude of one half of a motion vector. However, since the entire screen cannot be always searched, an interpolation vector is generated for a boundary portion by using an average motion vector within a screen or by using a neighboring motion vector.

The interpolation image generating unit 505 generates an interpolation frame from an interpolation vector only if the interpolation control signal from the scene screening unit 501 is ON. If the interpolation control signal is OFF, the interpolation image generating unit 505 repeatedly outputs an input video frame.

An average motion vector within a screen is held in the storing unit 502, and referred as a prediction vector in a motion vector search at the next time. In this case, the possibility increases where the neighborhood of the prediction vector becomes a candidate of an optimum motion vector, and a result of the search made at the next time is obtained from the neighborhood of the prediction vector. As a result, all of motion vectors within the screen gradually become identical to the average motion vector, and feedback is provided so that scene screening works effectively also for the next video frame.

Figure 2B:
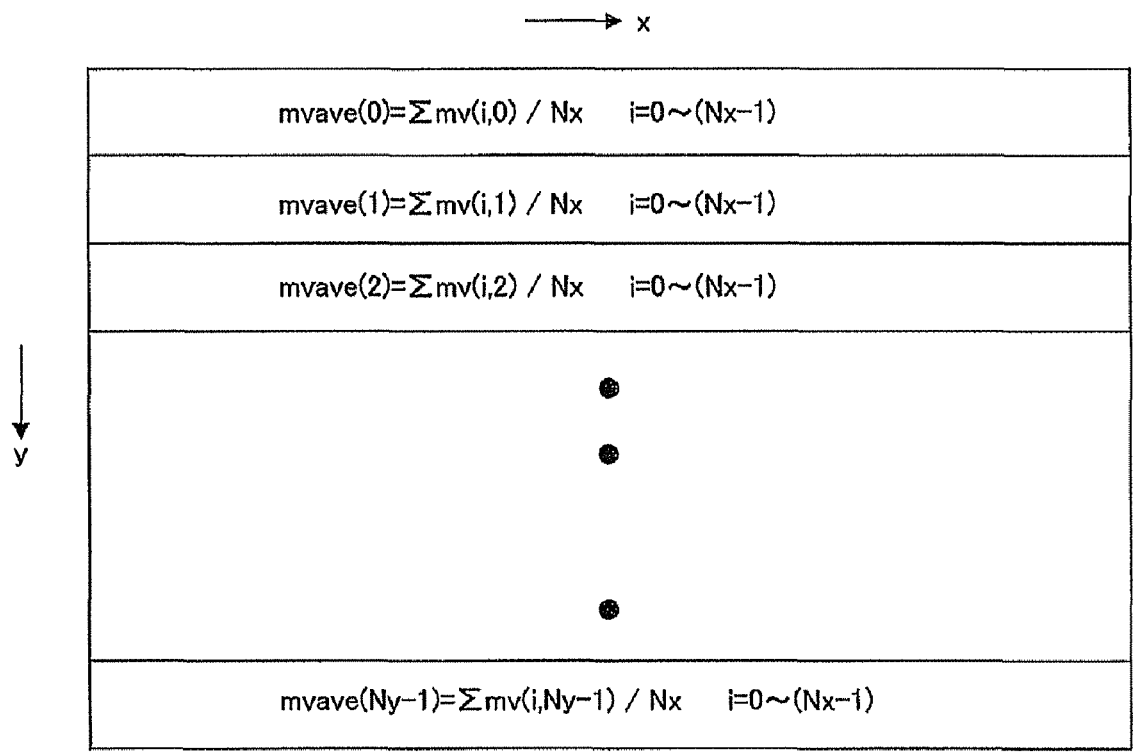
FIG. 2B shows how to obtain an average motion vector within a screen.

FIG. 2B exemplifies how to obtain an average motion vector within a screen. Typically, a screen of one video frame is partitioned into a plurality of block regions of a predetermined size, and a motion vector is obtained for each of the blocks. This example assumes that the horizontal and the vertical directions of the screen are x and y axes respectively, the screen is partitioned into Nx×Ny blocks, and a motion vector at block coordinates (i,j) is denoted as mv(i,j) (i=0, 1, ..., Nx−1, j=0, 1, ..., Ny−1). Nx and Ny respectively represent the numbers of blocks in the horizontal and the vertical directions.

The average motion vector within the screen mvaveall is obtained by calculating an average value mvave (j) of Nx mv(i,j) in the horizontal direction for each line, and by calculating an average value of obtained Ny mvave(j).

$$mvave(j) = \frac{\sum_{i=0}^{Nx-1} mv(i,j)}{Nx} \quad (j = 0, 1, \ldots, Ny-1) \quad (1)$$

$$mvaveall = \frac{\sum_{j=0}^{Ny-1} mvave(j)}{Ny} \quad (2)$$

Figure 3:
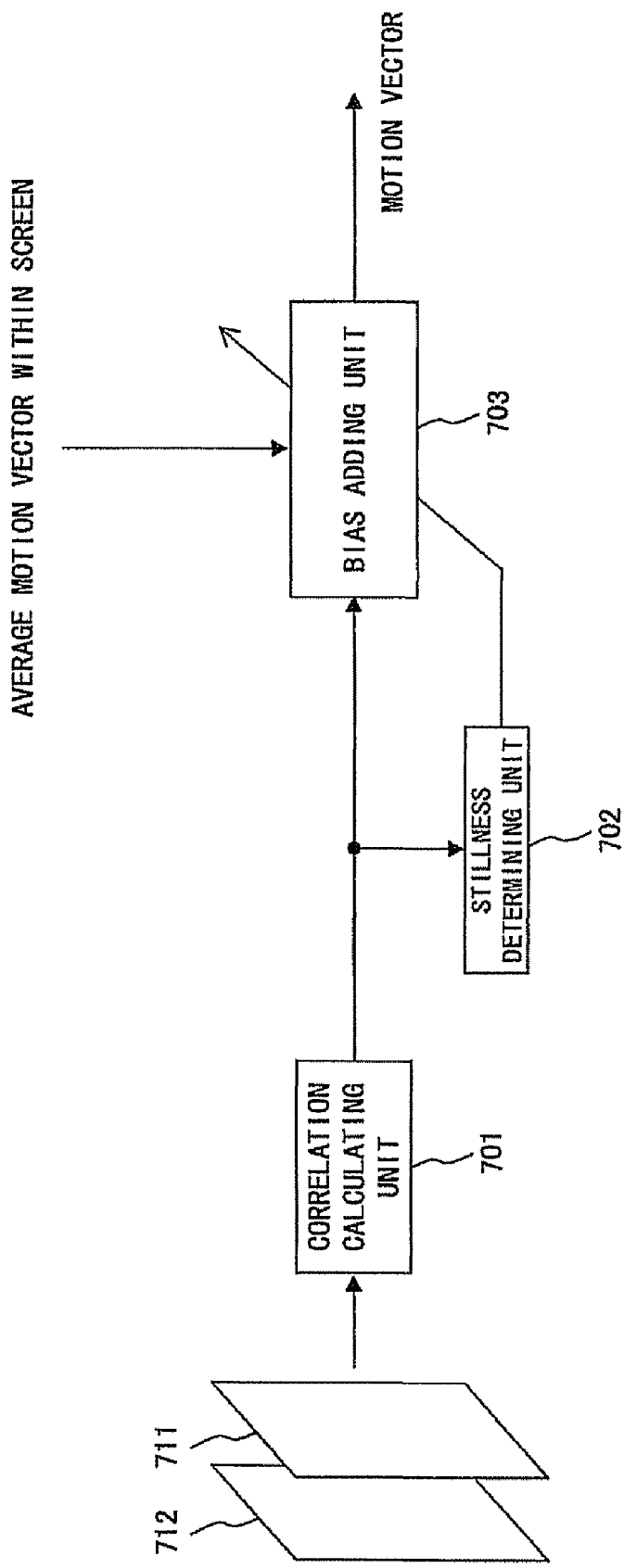
FIG. 3 shows a configuration of a first motion vector searching unit.

FIG. 3 shows a configuration example of the motion vector searching unit 503. The motion vector searching unit 503 includes a correlation calculating unit 701, a stillness determining unit 702, and a bias adding unit 703. The correlation calculating unit 701 configures a first stage, whereas the bias adding unit 703 configures a second stage.

The correlation calculating unit 701 detects a correlation between a preceding video frame 711 indicated by a delayed image signal and a video frame 712 indicated by the current image signal, and outputs a plurality of motion vector candidates. The stillness determining unit 702 determines whether or not a block is a still region, based on the degree of change of a video image within the block and a motion vector candidate indicating a still state. The bias adding unit 703 adds to a block, which is determined not to be a still region, a search bias for implementing an average motion vector within a screen as a reference motion vector with the maximum bias, and selects one motion vector candidate from among the plurality of motion vector candidates.

Figure 4:
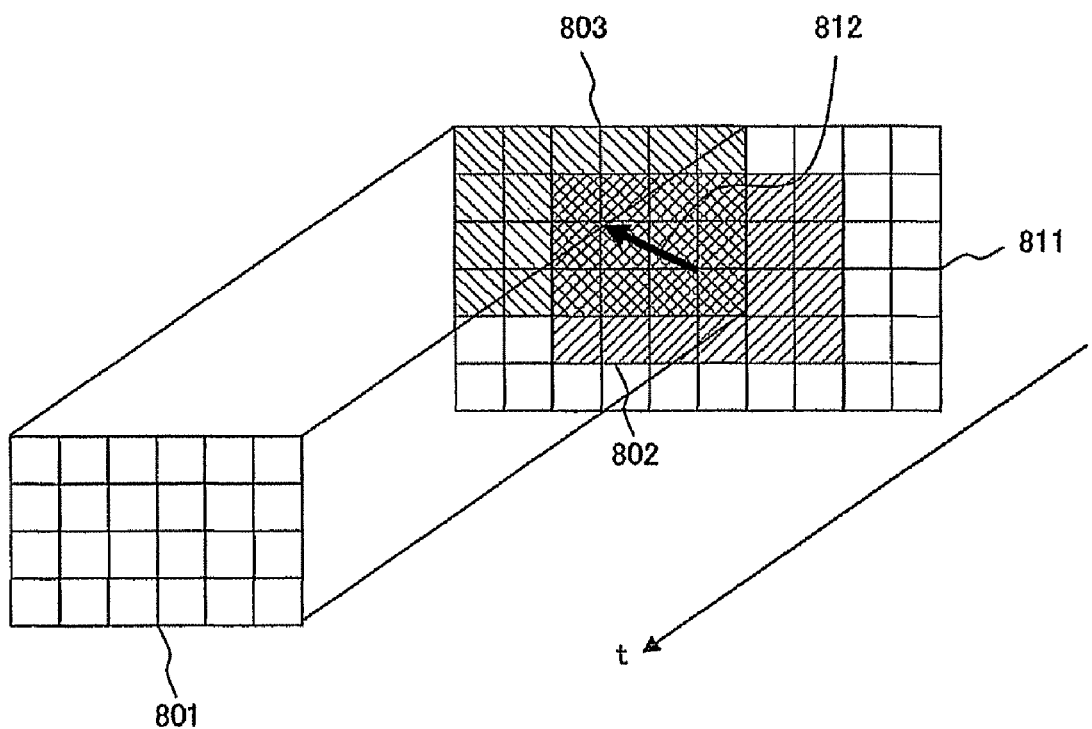
FIG. 4 shows a calculation of the degree of similarity between video frames.

The correlation calculating unit 701 calculates the degree of similarity between the current image of the video frame 712 and a reference image 811 of the video frame 711 as shown in FIG. 4, and outputs a result of the calculation. With the calculation of the degree of similarity, a block 803 is obtained by adding a position offset to a block 802 within the reference image 811, which corresponds to a block 801 composed of n×m pixels within the current image, based on a motion vector candidate 812. Then, the degree of similarity of the vector candidate 812 is calculated by making a matching between the blocks 801 and 803.

Typically, the total sum of absolute values of differences for each of n×m pixels within a block is obtained as the degree of similarity. Accordingly, the degree of matching between the blocks 801 and 803 increases as the degree of similarity decreases. Such a calculation of the degree of similarity is made for each of a plurality of motion vector candidates, and the degrees of similarity are obtained. A conventional motion vector searching unit selects a motion vector candidate having the lowest degree of similarity as a motion vector of the block 801, namely, an image offset.

The stillness determining unit 702 determines whether or not a motion exists for each block by using the degree of change of a video image within a block, and the degree of similarity of a motion vector candidate indicating a still state. Here, if the stillness determining unit 702 determines that a motion exists, the bias adding unit 703 adds a bias for increasing the probability of selecting an average motion vector within a screen to the degree of similarity of each motion vector candidate, and selects a motion vector. If the stillness determining unit 702 determines that a motion does not exist, a motion vector candidate indicating a still state is output as a search result is of a motion vector. As a result, even if a portion not in motion exists in a scrolling video image, it can be prevented from being interpolated as shifted in the scrolling direction.

Figure 5:
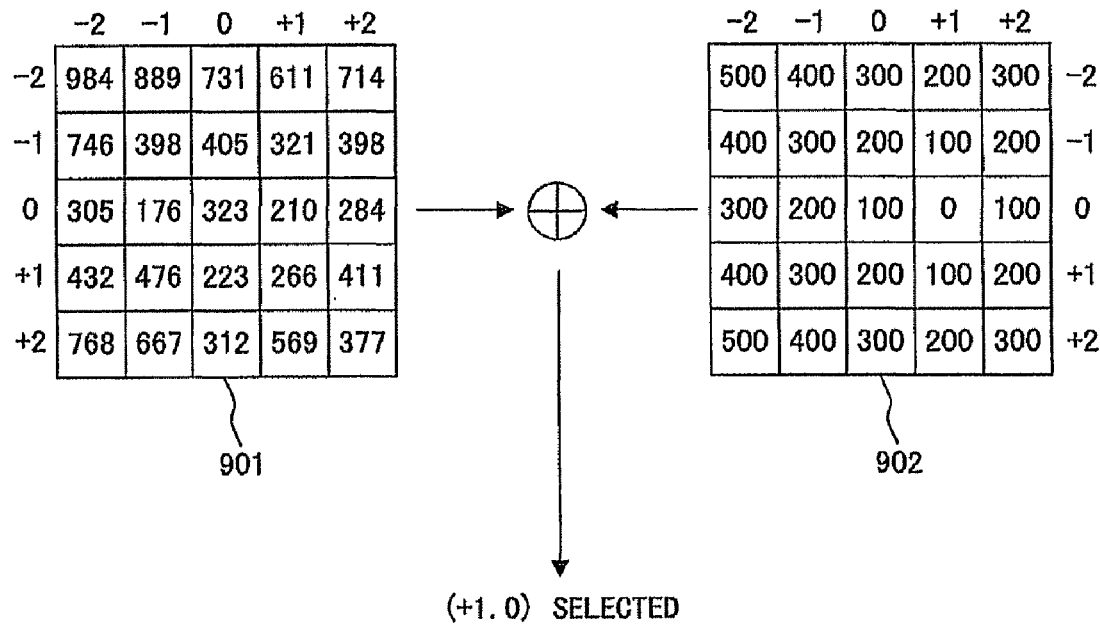
FIG. 5 shows how to add a search bias.

FIG. 5 shows an example where an average motion vector within a screen is referred, and a search bias is added to the direction of a vector. This example assumes that an average motion vector within a screen, which is obtained at a preceding time, is (+1,0), and the search range of a motion vector is (±2,±2).

In this case, the correlation calculating unit 701 calculates the degrees of similarity of 25 (=5×5) motion vector candidates, which are centered around a motion vector candidate (0,0) indicating a still state, and outputs a similarity degree value table 901. In the similarity degree value table 901, the horizontal direction represents an x component of a motion vector candidate, and the vertical direction represents a y component of the motion vector candidate. A value denoted in a cell (x,y) represents the degree of similarity obtained for a motion vector candidate (x,y).

The bias adding unit 703 prepares a bias value table 902 the size of which is the same as the similarity degree value table

901, and sets a bias value for each motion vector candidate. In this example, the bias value of the average motion vector within the screen (+1,0) is assumed to be 0, and a bias value that grows with an increase in a distance from this candidate is set.

Next, the bias adding unit 703 adds the degree of similarity of each cell in the similarity degree value table 901 and the bias value of each cell in the bias value table 902, and selects as a motion vector a motion vector candidate the obtained value of which is the minimum. If only the results of the calculation of the similarity degree value table 901 are used, a candidate (−1,0) corresponding to the minimum value "176" of the degree of similarity is selected as a motion vector. However, if a motion vector is selected after adding the bias value table 902, the same vector (+1,0) as the average motion vector within the screen can be selected.

A specific example of a stillness determination process executed by the stillness determining unit 702 is described next. FIG. 6 shows brightness values of pixels in a block composed of 8×8 pixels. In this example, it is proved that the brightness values significantly vary at the boundary of a linear line 1001, and a sharp edge exists on the linear line 1001. FIG. 7 shows a similarity degree value table when a motion vector of this block is searched in the search range of (±2,±2). In this example, it is proved that the degree of similarity "61" of a motion vector candidate (0,0) is the minimum. In this case, the stillness determination is made with either of the following two methods.

With a first stillness determination process, a variance of the pixel values within the block is used for a calculation of the degree of change. If an arithmetic computation of the total sum of all the pixels within the block is denoted as Σ when the brightness values are used as pixel values, the degree of change is obtained with the following equation.

degree of change=Σ(absolute value of difference between brightness value of target pixel and luminance value of immediately rightward pixel+ absolute value of difference between luminance value of the target pixel and luminance value of immediately downward pixel) (3)

If the degree of change is sufficiently high, and the degree of similarity of the motion vector candidate (0,0) is the minimum, and the degree of similarity of the motion vector candidate (0,0) is sufficiently low, the corresponding block is determined to be still. The degree of change is determined to be sufficiently high if it is higher than a predetermined threshold value, whereas the degree of similarity is determined to be sufficiently low if it is lower than a predetermined threshold value.

These threshold values can be experimentally determined. Assuming that an error of a pixel value is E, and the number of pixels of a block is n×m, a threshold value T1 of the degree of similarity is set to E×n×m, and a threshold value T2 of the degree of change is set to an approximately two-fold value of T1.

With a second stillness determination process, a difference between the maximum and the minimum values of the degree of similarity within a search range is used for the calculation of the degree of change. In this case, the degree of change is obtained with the following equation degree of change=maximum value of the degree of similarity −minimum value of the degree of similarity (4)

If the degree of change is sufficiently high, and the degree of similarity of the motion vector candidate (0,0) is the minimum, and the degree of similarity of the motion vector candidate (0,0) is sufficiently low, the corresponding block is determined to be still. In this case, for example, the above described value is set as the threshold value T1 of the degree of similarity, and the threshold value T2 of the degree of change is set to an approximately three-fold value of T1.

In the examples shown in FIGS. 6 and 7, the degree of change represented by the equation (3) becomes sufficiently high due to the sharp edge on the linear line 1001, and the degree of change represented by the equation (4) becomes sufficiently high because 984−61=923. Moreover, the degree of similarity "61" of the motion vector candidate (0,0) is the minimum within the search range, and is a sufficiently small value. Accordingly, this block is determined to be still with both of the stillness determination processes.

Figure 8:
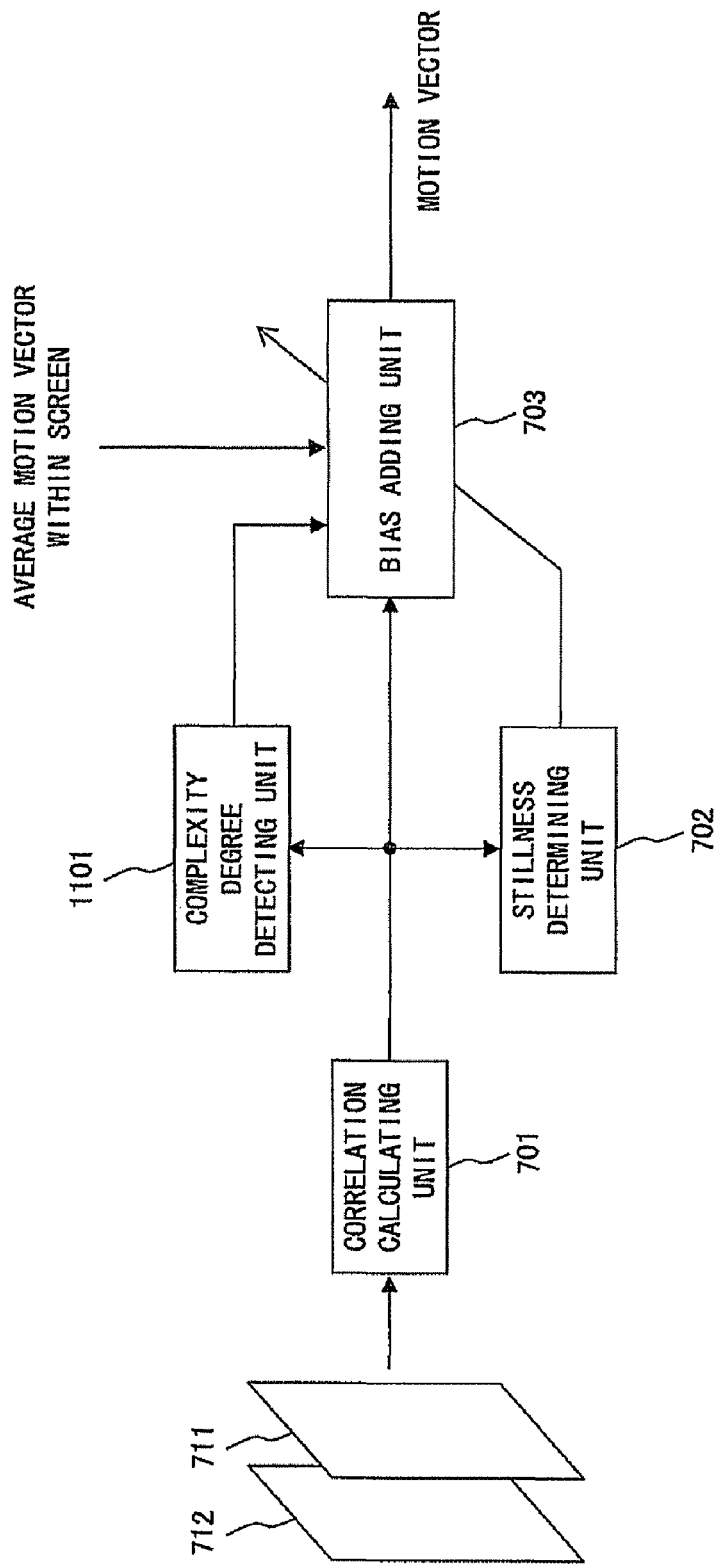
FIG. 8 shows a configuration of a second motion vector searching unit.

FIG. 8 shows another configuration example of the motion vector searching unit 503. The motion vector searching unit shown in FIG. 8 has a configuration implemented by adding a complexity degree detecting unit 1101 to the motion vector searching unit shown in FIG. 3.

The complexity degree detecting unit 1101 detects the degree of complexity of a video image based on the correlation values of a plurality of motion vector candidates output from the correlation calculating unit 701, and outputs the detected degree to the bias adding unit 703. The bias adding unit 703 changes bias values for the motion vector candidates according to the detected degree of complexity.

In a portion having a high degree of complexity of a screen, its motion vector candidate is also expected to be complex, and the portion can be an area, from which a geometric pattern is extracted, with high possibility. Therefore, increasing a bias makes it easier to select a motion vector candidate existing in the neighborhood of an average motion vector within a screen. As a result, selecting an average motion vector within a screen causes the corresponding portion to follow peripheral movements even when some motion vector candidates emerge due to a repetition of a geometric pattern, whereby image quality can be prevented from being degraded by erroneous interpolation.

FIG. 9 exemplifies similarity degree value tables and bias value tables of blocks of two types having different degrees of complexity. Since absolute values of the degrees of similarity are low in a similarity degree value table 1111, this block corresponds to an image that has few edges and is almost flat, and its degree of complexity is low. In contrast, in a similarity degree value table 1113, the minimum value of the degrees of similarity is large, and the degrees of similarity are rather high as a whole. Accordingly, this block corresponds to an image that has many edges and is complex.

Here, assuming that a difference between the maximum and the minimum values of the degree of similarity is used as the degree of complexity likewise the degree of change represented by the equation (4), the degree of complexity obtained from the similarity degree value table 1111 results in 353−9=344, and that obtained from the similarity degree value table 1113 results in 7244−881=6363.

If a bias value table 1112 is added to the similarity degree value table 1111 having a low degree of complexity, a bias value table 1114 considering the ratio of the degrees of complexity of both the similarity degree value tables is added to the similarity degree value table 1113 having a high degree of complexity. Bias values of the bias value table 1114 are obtained by multiplying the bias values of the bias value table 1112 by 6363/344. Note that the total sum of the degrees of similarity within the similarity degree value table may be used as the degree of complexity.

Figure 10:
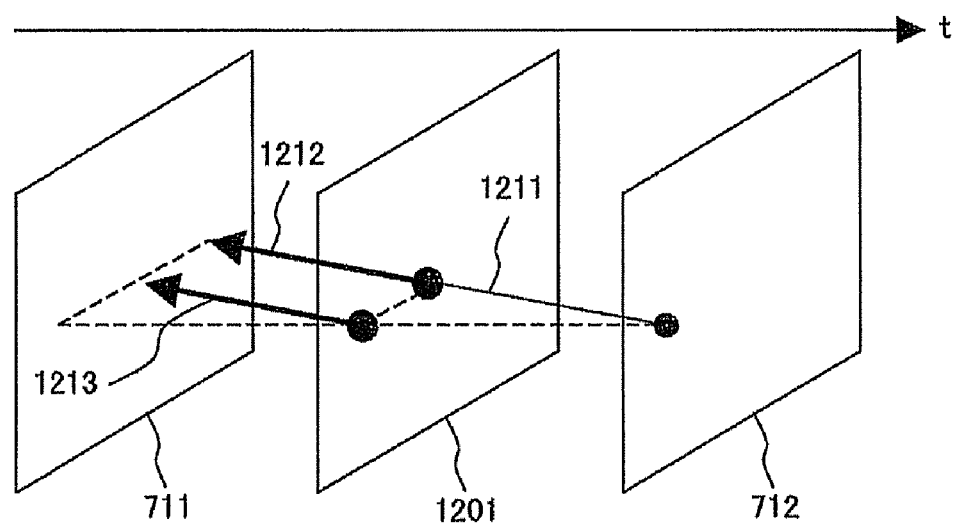
FIG. 10 shows an interpolation vector.

FIG. 10 shows an interpolation vector generated by the interpolation image generating unit 505. If an interpolation frame 1201 is generated at the midpoint between the video frames 711 and 712, the interpolation image generating unit 505 initially generates a vector 1212 having a magnitude that is one half of a motion vector 1211, and generates an interpolation vector 1213 by shifting the starting point of the vector 1212.

FIG. 11 shows a configuration example of the scene screening unit 501. The scene screening unit 501 includes a feature amount calculating unit 1301 and an interpolation controlling unit 1302. The feature amount calculating unit 1301 includes a variance calculating unit 1311 and an average calculating unit 1312.

The average calculating unit 1312 calculates an average motion vector within a screen mvaveall from motion vectors of one frame with the method shown in FIG. 2B, stores the calculated average motion vector in the storing unit 502, and outputs the average motion vector to the variance calculating unit 1311 and the interpolation controlling unit 1302. The variance calculating unit 1311 calculates a variance A of motion vectors with the following equation by using the average motion vector within the screen mvaveall.

$$\Delta = \sum_{j=0}^{N_y-1} |mvave(j) - mvaveall| \quad (5)$$

The above equation obtains the variance Δ from a difference between the average value mvave(j) in the horizontal direction of the motion vector mv (i,j) and mvaveall. However, an average value mvave(i) in the vertical direction of the motion vector mv(i,j) may be used as a replacement for mvave (j). Moreover, the sum of a variance obtained from mvave (j) and that obtained from mvave(i) may be used as the variance Δ.

The interpolation controlling unit 1302 uses as a determination value a quotient obtained by dividing the variance Δ by the magnitude of mvaveall, determines that a scene where a motion within a screen is uniform, namely, a scene having an interpolation effect is detected if the determination value is sufficiently small, and turns on the interpolation control signal. Specifically, the interpolation controlling unit 1302 turns on the interpolation control signal if the determination value is smaller than a predetermined threshold value, and turns off the interpolation control signal if the determination value is equal to or larger than the threshold value. The variance Δ itself may be used as the determination value.

As described above, the frame interpolating apparatus holds a previous average motion vector within a screen, adds a search bias based on the held vector in a motion vector search at the current time, detects a still region based on an activity within a block, and does not add a search bias to the still region. As a result, a variance of motion vectors can be suppressed by restricting only to a region in motion, and the number of video frames selected by the scene screening increases. Accordingly, scene screening can be made with higher precision in a wider range in comparison with conventional techniques.

In the meantime, the calculation of the amount of feature by the scene screening unit 501 can be made more precisely by using a result of a stillness determination made by the motion vector searching unit 503. In this case, a region to be included for the calculation of the amount of feature, and a region to be excluded are screened by using the result of the stillness determination before the scene screening process.

FIG. 12 shows a configuration example of such a frame interpolating apparatus. In this configuration, the scene screening unit 501 of FIG. 2A is replaced with a scene screening unit 1401, and the motion vector searching unit 503 outputs stillness information, which indicates the result of the determination made by the stillness determining unit 702, to the scene screening unit 1401.

The scene screening unit 1401 includes a still region excluding unit 1501, a feature amount calculating unit 1301, and an interpolation controlling unit 1302 as shown in FIG. 13. If the stillness information indicates that a motion exists, the still region excluding unit 1501 outputs the motion vector of the corresponding block to the feature amount calculating unit 1301. Or, if the still information indicates that no motion exists, the still region excluding unit 1501 does not output the motion vector of the block to the feature amount calculating unit 1301. In this way, a motion vector of a still region is excluded from the calculation of the amount of feature.

Typically, a variance of motion vectors increases if the calculation of the amount of feature is made including a still region, and the magnitude of an average motion vector within a screen, which indicates an average scrolling speed, is calculated to be smaller than an actual magnitude. Such a calculation shift can be prevented by excluding a still region from the calculation of the amount of feature, and the amount of feature can be obtained more precisely. Accordingly, the number of video frames selected by scene screening increases.

Processes of the variance calculating unit 1311 and the average calculating unit 1312 are similar to those in the case of FIG. 11. However, an averaging process is executed only for a block in motion by excluding a still block in the calculation of an average motion vector within a screen shown in FIG. 23. Therefore, Nx and Ny sometimes become values smaller than the numbers of blocks in the horizontal and the vertical directions respectively.

Figure 14:
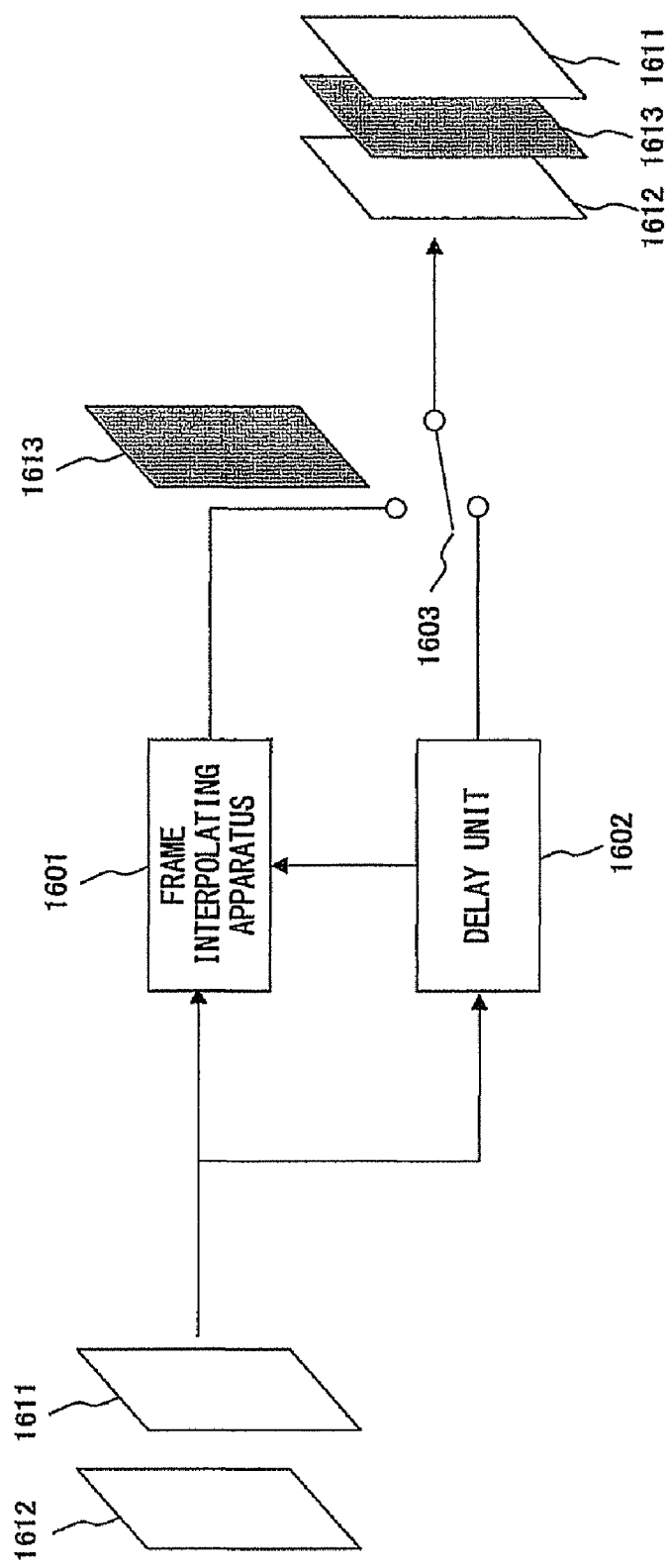
FIG. 14 shows a configuration of a frame rate converting apparatus.

FIG. 14 shows a configuration example of a frame rate converting apparatus using the frame interpolating apparatus according to the preferred embodiment. The frame rate converting apparatus comprises a frame interpolating apparatus 1601, a delay unit 1602, and a switch 1603. The frame rate converting apparatus improves the frame rate of an input video image.

The delay unit 1602 delays consecutively input video frames 1611 and 1612 by a predetermined amount of time, and outputs the video frames. The frame interpolating apparatus 601 generates an interpolation frame 1613 from the video frame 1612 at the current time, and the video frame at the preceding time, which is output from the delay unit 1602. The switch 1603 alternately selects and outputs the video frame output from the delay unit 1602, and the interpolation frame 1613 output from the frame interpolating apparatus 1601. As a result, the video frame 1611, the interpolation frame 1613, and the video frame 1612 are output in this order from the frame rate converting apparatus.

FIG. 15 shows a configuration example of a video playback apparatus using the frame rate converting apparatus shown in FIG. 14. This video playback apparatus comprises a video data storing device 1701, a decoding device 1702, a frame rate converting apparatus 1703, and a display 1704. The decoding device 1702 decodes video data stored in the video data storing device 1701, and outputs video frames. The frame rate converting apparatus 1703 inserts an interpolation frame between video frames, and the display 1704 makes the frames visible on a screen in time series.

FIG. 16 shows a configuration example of a video displaying device using the frame rate converting apparatus shown in FIG. 14. This video displaying device comprises a video data receiver 1801, a frame rate converting apparatus 1703, and a display 1802. The video data receiver 1801 receives video frames from a communications network. The frame rate converting apparatus 1703 inserts an interpolation frame between video frames. The display 1802 makes the frames visible on a screen in time series.

To implement the processes of the frame interpolating apparatus 1601 and the frame rate converting apparatus 1703 with software, an information processing device (computer) shown in FIG. 17 is used. The information processing device shown in FIG. 17 comprises a CPU (Central Processing Unit) 1901, a memory 1902, an input device 1903, an output device 1904, an external storage device 1905, a medium driving device 1906, and a network connecting device 1907, which are interconnected by a bus 1908.

The memory 1902 includes, for example, a ROM (Read Only Memory), a RAM (Random Access Memory), etc., and stores a program and data, which are used for processes. The CPU 1901 executes a frame interpolation process and a frame rate conversion process by executing the program with the memory 1902.

In this case, input video frames are stored in the memory 1902 as data to be processed, and searched motion vectors are stored in the memory 1902 as data resulting from the process. The storing unit 502 corresponds to the memory 1902. The scene screening units 501 and 1401, the motion vector searching unit 503, the interpolation vector generating unit 504, and the interpolation image generating unit 505 correspond to the program stored in the memory 1902.

The input device 1903 is, for example, a keyboard, a pointing device, etc., and used to input an instruction or information from an operator. The output device 1904 is, for example, a display, a printer, a speaker, etc., and used to make an inquiry to an operator, or to output a process result.

The external storage device 1905 is, for example, a magnetic disk device, an optical disk device, a magneto-optical disk device, a tape device, etc. The information processing device stores a program and data on the external storage device 1905, and uses the program and the data by loading them into the memory 1902 as needed.

The medium driving device 1906 drives a portable recording medium 1909, and accesses its recorded contents. The portable recording medium 1909 is an arbitrary computer-readable recording medium such as a memory card, a flexible disk, an optical disk, a magneto-optical disk, etc. An operator stores a program and data onto the portable recording medium 1909, and uses the program and the data by loading them into the memory 1902 as needed.

The network connecting device 1907 is connected to a communications network such as a LAN (Local Area Network), etc., and performs data conversion that occurs with a communication. Moreover, the information processing device receives a program and data from an external device via the network connecting device 1907, and uses the program and the data by loading them into the memory 1902, as occasion demands.

Figure 18:
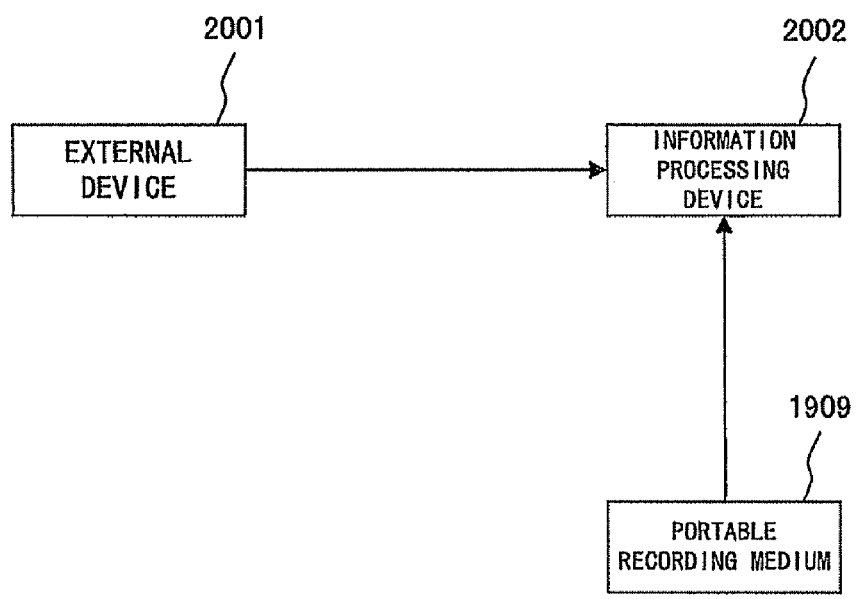
FIG. 18 shows a method for providing a program and data.

FIG. 18 shows a method for providing a program and data to the information processing device shown in FIG. 17. The program and the data stored onto the portable recording medium 1909 or in a database of an external device 2001 are loaded into the memory 1902 of an information processing device 2002. The external device 2001 generates a carrier signal for carrying the program and the data, and transmits the carrier signal to the information processing device 2002 via an arbitrary transmission medium on a communications network. The CPU 1901 executes the program with the data, and executes the above described processes.

What is claimed is:

1. A frame interpolating apparatus for obtaining a motion vector for each block within an input video frame, and for generating an interpolation frame from the obtained motion vector, comprising:
    an average calculating unit configured to calculate an average motion vector within a screen by averaging motion vectors within the screen for each video frame;
    a storing unit configured to store the calculated average motion vector within the screen;
    a motion vector searching unit configured to search a motion vector for each block of a current video frame by using a previous average motion vector within a screen, which is calculated for a previous video frame and stored in said storing unit, as a reference motion vector;
    an interpolation controlling unit configured to determine whether or not interpolation is effective by using an obtained motion vector; and
    an interpolating unit configured to generate the interpolation frame between the current video frame and a preceding video frame by using the obtained motion vector if the interpolation is determined to be effective.

2. The frame interpolating apparatus according to claim 1, wherein
    said motion vector searching unit includes
        a correlation calculating unit configured to calculate a correlation value between the current video frame and the preceding video frame for each of a plurality of motion vector candidates for a block within the current video frame,
        a stillness determining unit configured to determine whether or not the block is a still region, and
        a bias adding unit configured to select a motion vector candidate by adding a search bias for increasing a probability of selecting the reference motion vector to a correlation value of each motion vector candidate for a block determined not to be a still region, and to output the selected motion vector candidate as a motion vector of the block.

3. The frame interpolating apparatus according to claim 2, wherein
    said stillness determining unit determines whether or not the block is a still region based on a degree of change of a video image within the block, and a correlation value of a motion vector candidate indicating a still state.

4. The frame interpolating apparatus according to claim 2, wherein
    said motion vector searching unit further includes a complexity degree detecting unit configured to detect a degree of complexity of a video image based on correlation values of the plurality of motion vector candidates; and
    said bias adding unit changes a value of the search bias according to the detected degree of complexity.

5. The frame interpolating apparatus according to claim 1, further comprising
    a variance calculating unit configured to calculate a variance of motion vectors within a screen for each video frame, wherein
    said interpolation controlling unit determines whether or not interpolation is effective, based on the calculated variance of motion vectors.

6. The frame interpolating apparatus according to claim 5, further comprising
    an excluding unit configured to exclude a motion vector of a block, which is determined to be a still region, from obtained motion vectors, wherein:
    said average calculating unit calculates the average motion vector within the screen from remaining motion vectors from which the motion vector of the block that is determined to be the still region is excluded; and said variance calculating unit calculates the variance of motion vectors from the remaining motion vectors.

7. A frame rate converting apparatus comprising the frame interpolating apparatus according to claim 1.

8. A video playback apparatus comprising a video data storing device, and the frame rate converting apparatus according to claim 7, wherein the frame rate converting apparatus converts a frame rate by interpolating video data output from the video data storing device.

9. A video displaying device comprising a video data receiver, and the frame rate converting apparatus according to claim 7, wherein the frame rate converting apparatus converts a frame rate by interpolating video data received by the video data receiver.

10. A non-transitory computer-readable recording medium on which is recorded a program for causing a computer, which obtains a motion vector for each block within an input video frame and generates an interpolation frame from the obtained motion vector, to execute a process, the process comprising:

calculating an average motion vector within a screen by averaging motion vectors within the screen for each video frame;

storing the calculated average motion vector within the screen in a storing unit;

searching a motion vector for each block of a current video frame by using a previous average motion vector within a screen, which is calculated for a previous video frame and stored in the storing unit, as a reference motion vector;

determining whether or not interpolation is effective by using an obtained motion vector; and generating the interpolation frame between the current video frame and a preceding video frame by using the obtained motion vector if the interpolation is determined to be effective.

11. A frame interpolating method with which a computer obtains a motion vector for each block within an input video frame and generates an interpolation frame from the obtained motion vector, comprising:

calculating an average motion vector within a screen by averaging motion vectors within the screen for each video frame;

storing the calculated average motion vector within the screen in a storing unit;

searching a motion vector for each block of a current video frame by using a previous average motion vector within a screen, which is calculated for a previous video frame and stored in the storing unit, as a reference motion vector;

determining whether or not interpolation is effective by using an obtained motion vector; and generating the interpolation frame between the current video frame and a preceding video frame by using the obtained motion vector if the interpolation is determined to be effective.

* * * * *

UNITED STATES PATENT AND TRADEMARK OFFICE
CERTIFICATE OF CORRECTION

PATENT NO. : 8,159,605 B2  Page 1 of 1
APPLICATION NO. : 12/058078
DATED : April 17, 2012
INVENTOR(S) : Teruyuki Sato et al.

It is certified that error appears in the above-identified patent and that said Letters Patent is hereby corrected as shown below:

Cover Page Column 1 item (30), (Foreign Application Priority Data), Delete "2007-296138" and insert --2007-296133--, therefor.

Signed and Sealed this
Twenty-eighth Day of August, 2012

David J. Kappos
*Director of the United States Patent and Trademark Office*